(12) United States Patent
Lienkamp et al.

(10) Patent No.: US 7,862,948 B2
(45) Date of Patent: Jan. 4, 2011

(54) CONTROL OF NITROGEN FRACTION IN A FLOW SHIFTING FUEL CELL SYSTEM

(75) Inventors: Sebastian Lienkamp, Budenheim (DE); Peter Willimowski, Rossdorf (DE); David A. Arthur, Honeoye Falls, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1051 days.

(21) Appl. No.: 11/612,108

(22) Filed: Dec. 18, 2006

(65) Prior Publication Data
US 2008/0145715 A1    Jun. 19, 2008

(51) Int. Cl.
*H01M 8/04* (2006.01)
(52) U.S. Cl. .................. 429/432; 429/415; 429/430; 429/444; 429/544
(58) Field of Classification Search .............. 429/408, 429/415, 427, 428, 430, 431, 432, 433, 443, 429/444, 452, 544
See application file for complete search history.

(56) References Cited

U.S. PATENT DOCUMENTS

| | | | |
|---|---|---|---|
| 5,763,113 A * | 6/1998 | Meltser et al. | 429/432 |
| 6,979,506 B2 * | 12/2005 | Ballantine et al. | 429/432 |
| 2004/0131899 A1 | 7/2004 | Cargnelli et al. | |

* cited by examiner

*Primary Examiner*—Jennifer K Michener
*Assistant Examiner*—Carlos Barcena
(74) *Attorney, Agent, or Firm*—Dinsmore & Shohl LLP (57) ABSTRACT

A device and method to predict and regulate nitrogen concentration in a flow shifting system. In one aspect of the system, a bleed valve fluidly coupled to multiple fuel cell stacks is used to reduce the presence of nitrogen in an anode flowpath. One or more sensors can be used to measure voltage within one or both of the fuel cell stacks. By assessing fuel cell voltage changes within the anode flowpath and equating such changes with nitrogen fraction buildup, the system can manipulate the bleed valve at appropriate times to improve system operability. In one form of equating the sensed voltage changes with the nitrogen fraction buildup, a predictive algorithm can be used by a logic device in a controller to compare the sensed voltage so that the controller instructs the bleed valve when to open and close. In a variation, the controller can compare the sensed voltages against stored data rather than rely on a formula or related algorithm.

12 Claims, 6 Drawing Sheets

CONTROL OF NITROGEN FRACTION IN A FLOW SHIFTING FUEL CELL SYSTEM

BACKGROUND OF THE INVENTION

The present invention relates generally to identifying and regulating the concentration of nitrogen buildup in an operating fuel cell, particularly to controlling the bleed of nitrogen in an anode loop of a flow shifting fuel cell system, and more particularly to simplifying a bleed algorithm for a flow shifting anode flowpath to maximize stable average stack voltages while minimizing hydrogen loss during the nitrogen bleed.

In a typical fuel cell system, hydrogen or a hydrogen-rich gas is supplied through a flowpath to the anode side of a fuel cell while oxygen (such as in the form of atmospheric oxygen) is supplied through a separate flowpath to the cathode side of the fuel cell. In one form of fuel cell, called the proton exchange membrane (PEM) fuel cell, an electrolyte in the form of a membrane is sandwiched between the anode and cathode to produce a layered structure commonly referred to as a membrane electrode assembly (MEA). Each MEA forms a single fuel cell, and many such single cells can be combined to form a fuel cell stack, increasing the power output thereof. Multiple stacks can be coupled together to further increase power output.

One fuel cell configuration that is particularly useful is referred to as a flow shifting fuel cell system. In such a system, two (or more) stacks have their respective hydrogen (or other fuel) flowpaths fluidly coupled to one another in series such that ports that allow the flow of fuel to and from each stack can function as both fuel inlet and outlet, depending on the flow direction of the shifted fuel. The system gets its name from the serially-plumbed anode flowpath between the two stacks, as fuel flows back and forth between the stacks in a semi-closed cyclical pattern. In this way, while the anode flowpath of one of the stacks is accepting fuel into its anode flowpath, the other can be closed off (i.e., dead-ended) to prevent the escape of the fuel that has passed through the stacks. After a certain period, a combination of valves or related flow manipulation devices cause a switch in flow direction, and the role of the two stacks reverses such that reactant flows from the second stack and into the now dead-ended first. In this way, the fuel is shuttled back and forth between the two anode flowpaths, while fresh fuel can be added to the stack that is not being dead-ended. Flow shifting fuel cell systems have advantages over other approaches, such as anode flowpath recirculation-based systems, for while both can be used to improve the hydration of anode flowpaths and the electrolytes, the recirculation-based system does so with recirculation pumps and other heavily-burdened components that, in addition to increasing system cost, weight and complexity, can wear out, thereby subjecting the system to greater maintenance concerns. In addition, the use of such pumps requires a source of power (for example, electrical power) that, being supplied by the operation of the fuel cells, reduces overall system efficiency.

As with most MEA fuel cell systems that react hydrogen and air across a membrane, the operation of a flow shifting fuel cell system causes a depletion of the oxygen present in the cathode flowpath, leaving behind unreacted nitrogen. The diffusion of this nitrogen across the membranes of the individual fuel cells and into the anode flowpath contributes to the dilution of hydrogen fuel. Such nitrogen build-up within the relatively closed anode flowpath can lead to decreased stack voltage, which in turn decreases power output and stack efficiency. To meliorate the effects of nitrogen dilution, bleed valves are placed within each stack's anode flowpath to vent or purge the nitrogen-rich gas therein. One way to do this is to bleed constantly, which entails leaving the bleed valves to alternate between open and closed all the time. Unfortunately, this is highly inefficient and would end up dumping otherwise useable hydrogen fuel overboard as well. In another approach, the valves are periodically opened at select intervals to allow venting to the atmosphere of the nitrogen and other reaction by-products without the inefficiencies introduced by the constant opening and closing of the continuous approach. Nevertheless, this approach is disadvantageous in that if too long of a period goes by before the bleed valves are opened, unstable operating conditions can arise due to an impermissibly low concentration of hydrogen.

It is possible to employ a proactive (i.e., predictive) trigger-based approach that tells the system that it is time to bleed. Such a trigger would initiate a bleed sequence before an adverse performance or operability issue arises, such as a reduction in voltage during operation. One example of a proactive trigger could be a nitrogen crossover model that predicts how much nitrogen has built up between the stacks. For example, if the model prediction states there is eighty one percent hydrogen between the stacks and the threshold to start bleeding is eighty percent, then the bleed could be triggered after the model prediction falls from eighty one percent to eighty percent. This would presumably occur before any of the stack voltages started oscillating with the shift period. This approach is disadvantageous in that there is an inherent amount of predictive uncertainty, especially as the stack ages and develops minute holes that permit greater crossover.

Still another example of a proactive trigger would be to have a constant bleed through a fixed orifice, where the nitrogen crossover rate can be approximated; the bleed orifice is sized to have the bleed rate equal the crossover rate. This approach has the advantage of being simple (as it does not require a valve), but suffers from the same problem mentioned above in that as the nitrogen crossover rate changes over time (due to, for example, the development of pinholes in the stack), the orifice may be too small to exhaust the built-up nitrogen quickly enough to keep up with the crossover rate.

In another proactive approach to tell the system that it is time to bleed, one or more direct hydrogen measuring sensors (such as a thermoconductivity device) can be placed between the stacks. Unfortunately, the anode flowpath is a harsh, wet environment, and finding a direct hydrogen measuring sensor that reliably, rapidly and accurately operates in such an environment is difficult and expensive. Even if such a system were employed, it would be desirable to have a back-up capability included.

Accordingly, it is desirable that a flow shifting fuel cell system provide the operability enhancements made possible through the use of bleed valves that minimizes system complexity and efficiency impacts. It is further desirable that a system remove nitrogen from an anode flowpath while minimizing the purging of unused hydrogen. It is still further desirable that a system and method of operation does not rely on a predictive model, instead employing an actual feedback of the performance of the stack. It is yet further desirable that such an approach is relatively impervious to changes in stack performance due to aging or the like.

BRIEF SUMMARY OF THE INVENTION

A flow shifting fuel cell system and a method of operating the system are disclosed. In accordance with a first aspect of the present invention, a method of operating a fuel cell system is described. The system includes a first fuel cell stack and a second fuel cell stack, where each is made up of numerous individual fuel cells. Each of the individual fuel cells in turn is made up of an anode, a cathode and a membrane disposed between the anode and cathode. Anode and cathode flowpaths couple the respective electrodes of the individual fuel cells within each of the first and second stacks to a fuel and oxygen source, respectively. The anode flowpath fluidly connects the first and second stacks to allow fuel present within the anode flowpath to cycle back and forth between the first and second stacks. One or more bleed valves are fluidly coupled to the anode flowpath, while one or more sensors are connected to measure voltages in either the stacks as a whole or individual cells within the stacks. The method includes introducing fuel into the anode flowpath such that the fuel flows through the stacks in a first direction, introducing oxygen into the cathode flowpath, sensing at least one voltage difference associated with operation of the system, reversing the flow of fuel through the anode flowpath such that the fuel flows through stacks in a second direction, correlating the sensed voltage difference with a fuel concentration in the anode flowpath, and manipulating the bleed valve(s) to allow at least a portion of the fluid present in the anode flowpath to escape. In the present context, the first and second fuel flow directions correspond to the generally back-and-forth motion of the fuel as it cycles through the anode flowpath between the two stacks. Generally, the first and second directions are opposite of each other. Also as will be understood by those skilled in the art, reductions in hydrogen concentration within the anode flowpath are the equivalent of nitrogen concentration buildup, as the consumption of hydrogen from the flowpath and the diffusion of nitrogen into the flowpath are generally contemporaneous events.

During fuel cell operation, the nitrogen level builds up in the anode flowpath. Fresh hydrogen is introduced into one or the other of the stacks during each half cycle of operation. In this way, the stack that receives the fresh injection of fuel will show an average cell voltage increase, while that of the stack at the remote end decreases. When the next half cycle begins such that a shift in flow direction reverses, the stack that was previously remote will now receive fresh hydrogen, while the stack that previously received the fuel will be remote. During this second half cycle, the average cell voltage of the stack receiving the fuel increases, while that of the now remote stack decreases. In the present context, one complete anode flowpath operating cycle corresponds to flowing of the hydrogen or hydrogen/nitrogen combination back and forth (i.e., in each of the first and second directions) one time. This cyclic operation is repeated. The magnitude of these measured voltage oscillations can be correllated to the concentration of hydrogen in the fluid flowing through the anode flowpath. This correlation can form the basis for controlling the system, examples of which may include changing the duty cycle of the bleed valve(s), which may be either simple open/close valves or a proportional valve (i.e., a valve that permits a range of opening from completely closed to completely open). The system may further include a controller cooperative with the one or more sensors and the one or more bleed valves. In this way, the controller performs the correlating between the sensed voltage(s) and the fuel concentration in the anode flowpath to determine if the attainment of a voltage difference threshold has been reached. The controller may also be configured to monitor other system parameters (for example, system load) that could be used to determine when a particular voltage difference threshold has been reached. In this way, the voltage difference threshold may be made to depend on other system parameters to further tailor an opening and closing sequence of the one or more bleed valves.

In one preferred embodiment, the correlation between a sensed voltage signal and the fuel concentration in the anode flowpath is represented in the controller by a formula or related algorithm that, in response to sensed voltage signal parameters input into the controller, can calculate an appropriate hydrogen concentration. In another preferred embodiment, the correlation between a sensed voltage signal and the fuel concentration in the anode flowpath is represented in the controller by values in a lookup table or related data storage device. In one form, the voltage sensing can include sensing a voltage corresponding to each of the first and second stacks substantially simultaneously (including sensing the respective voltages so that an average voltage within each of the first and second stacks can be determined). In another form, the voltage sensing can include sensing numerous voltages within one of the stacks so that either an average value within that stack or a high and low voltage within that stack can be determined. In still another form, the voltage sensing can include sensing voltages of an individual cell within a stack at different times so that a high and low voltage within that cell can be determined. In the present context, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue. The manner in which the sensors detect and convey the sensed signals can be varied, according to the need of the controller. For example, various sampling configurations, such as "sample and hold", may be employed to detect the voltage oscillation that occurs in the flow shifting process. Since the controller can be made to regulate the opening and closing of the bleed valves, it can use the results of the sample and hold in order to pick the highest and lowest points in the voltage oscillation. It will be appreciated by those skilled in the art that the controller may (if desired) be programmed to pick from other operating points of the oscillating voltage. It will also be appreciated that the sampling of the voltages and the flow switching can be synchronized, which gives a strong, relatively predictable feedback. In another form, the sampling of the voltages can be randomized. Passing the measured values through a filter (such as a low-pass filter) may be a favorable way of forwarding these values to the controller.

Part of manipulating the bleed valve(s) may include closing the valve after the passage of a certain amount of time. For example, the time may correspond to a duty cycle, such as the duration of one complete anode flowpath operating cycle (which may be on the order of a few seconds), or it may correspond to that passage of time that is proportional to the magnitude of measured voltage difference (for example, between the two stacks, or between high and low values within a single stack, between average values within each stack, or between high and low values within a single fuel cell). By way of example, the voltage difference threshold may be an absolute value (expressed in volts or fractions thereof) or a percentage of stack voltage, and may be influenced by other factors, such as system load. Such an approach could similarly be used in situations where a single bleed valve is used, where the valve may be fluidly disposed between the first and second stacks. The one or more bleed valves may be set up as three-way valves (in which case they may also operate to allow the introduction of fuel into the anode flowpath), or as two-way valves, in which case the system may also include separate fuel injection valves. In addition, one or more bleed valves can be placed between the two stacks. Valves can be a simple open/close valve, or may be a proportional valve.

According to another aspect of the invention, a fuel cell system is disclosed that includes a first stack, a second stack, a cathode flowpath configured to convey an oxidant to the first and second stacks, an anode flowpath configured to be connected between the first and second stacks such that a fuel present within the anode flowpath cycles back and forth between the first and second stacks, one or more bleed valves fluidly coupled to the anode flowpath, one or more sensors configured to measure a voltage difference and a controller cooperative with the stacks and the sensor(s) such that upon receipt of one or more signals corresponding to the sensed voltage difference that exceeds a predetermined value, the controller directs the bleed valve(s) to allow at least a portion of fluid resident within the anode flowpath to be purged.

Optionally, the predetermined value comprises a value representative of a hydrogen concentration of the fluid within the anode flowpath. More particularly, the value representative of the hydrogen concentration is stored in a manner that is accessible by the controller, such as by a built-in formula or algorithm, lookup table stored in read-only-memory or the like. In a particular option, a vehicle powered by the fuel cell system described herein is also disclosed. In such vehicle, the fuel cell system serves as a source of motive power.

According to another aspect of the invention, a flow shifting fuel cell system is disclosed. The system includes first and second stacks, each with at least one sensor and numerous individual fuel cells. As previously discussed, each of the individual fuel cells can be made up of an anode, a cathode and a membrane disposed between the anode and the cathode. A cathode flowpath is used to carry an oxygen-bearing fluid (such as air) to the first and second stacks, while an anode flowpath is connected between the first and second stacks and is used to fluidly couple the two stacks together. In this construction, a hydrogen-bearing fluid present within the anode flowpath cycles back and forth between the first and second stacks in a flow shifting pattern. The system further includes one or more flow manipulation devices that are fluidly coupled to the anode flowpath, while a controller is included that is in signal communication with the stacks such that upon receipt by the controller of signals that correspond to a sensed difference in voltage, the controller directs the flow manipulation device(s) to allow at least a portion of fluid resident within the anode flowpath to be purged. The sensed voltage difference is that which exceeds a predetermined value either between the stacks or between at least two of the plurality of individual cells within at least one of the stacks.

Optionally, the one or more flow manipulation devices may be one or more bleed valves. In another particular option, the sensed difference is made up of a sensed voltage difference. More particularly, the sensed voltage difference can be made up of an average voltage difference between the first and second stacks, a voltage difference between individual fuel cells within each stack, or some other voltage difference that is indicative of reduced hydrogen concentration within the hydrogen-bearing fluid. The flow manipulation device(s) may be one or more three-way valves. In this way, bleed from the anode flowpath, as well as fuel injection into the anode flowpath, can be controlled through the valve. Likewise, the flow manipulation device(s) may be made up of two-way valves.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1:
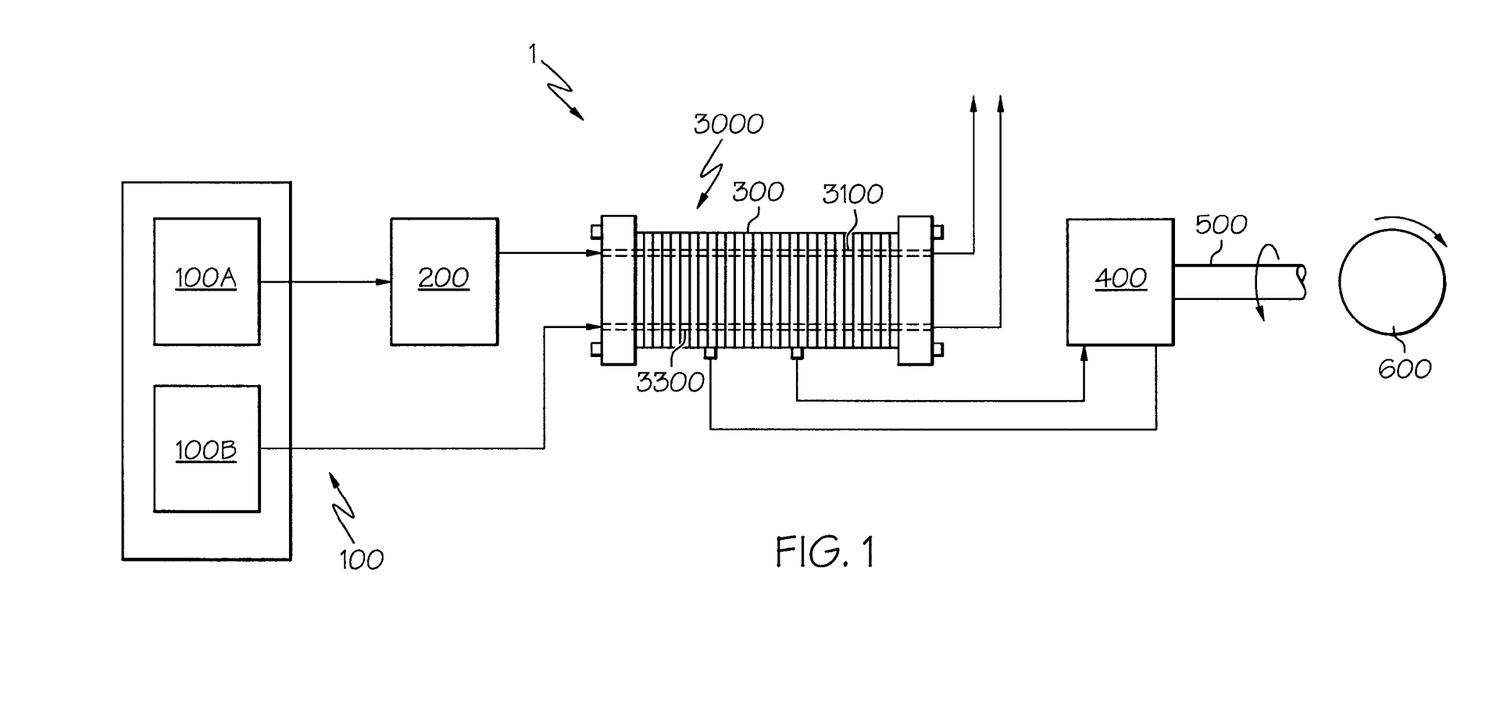
FIG. 1 shows a block diagram of a fuel cell system, including a fuel cell stack, configured for vehicular application.
Figure 6:
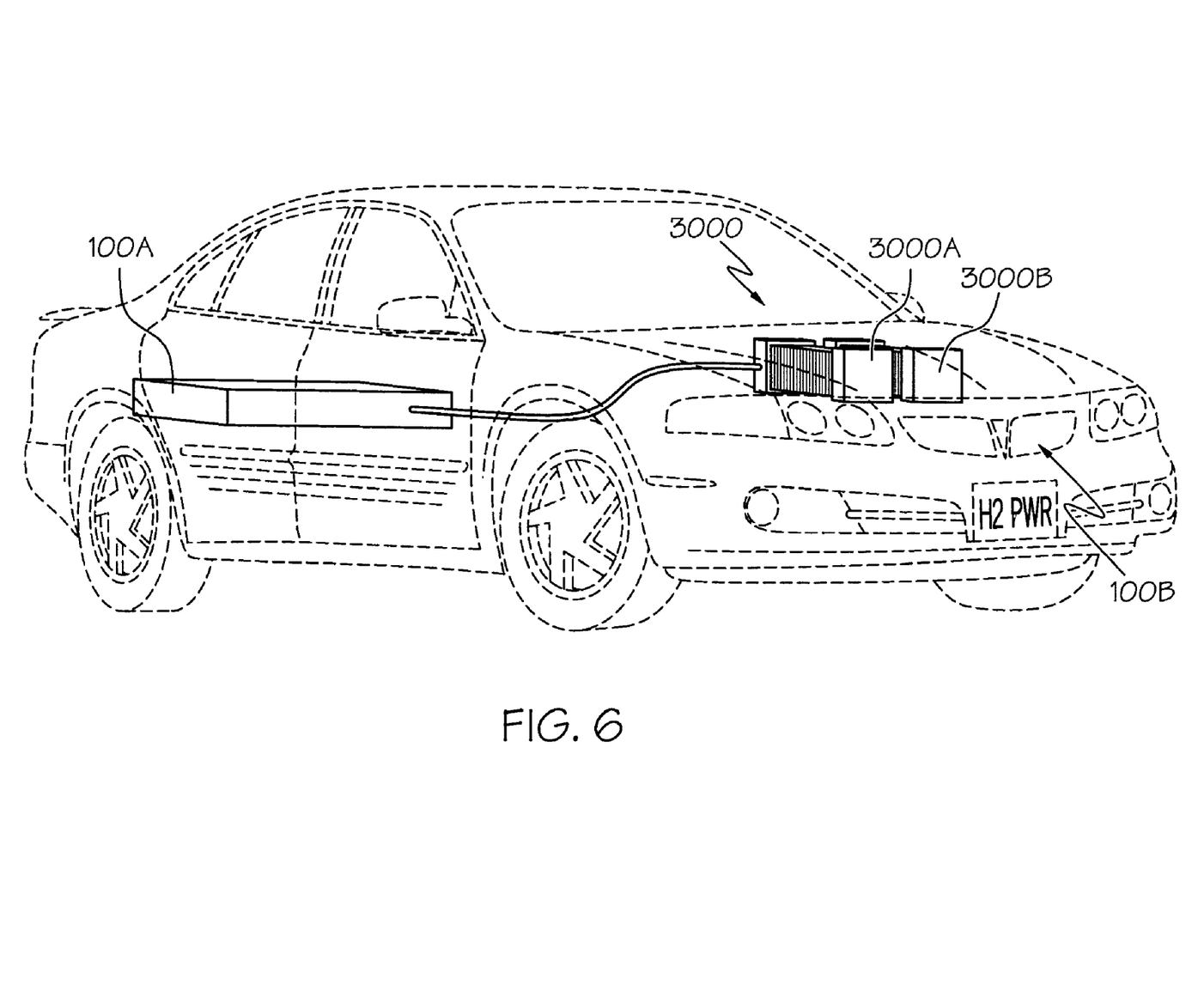
FIG. 6 shows a vehicle employing the flow shifting fuel cell system of the present invention.

Referring initially to FIGS. 1 and 6, a block diagram highlights the major components of a mobile fuel cell system 1 according to the present invention (FIG. 1), as well as a representative placement of a fuel cell system into an automotive application (FIG. 6). Referring with particularity to FIG. 1, the system 1 includes a reactant delivery system 100 made up of fuel source 100A and oxygen source 100B, fuel processing system 200, stack 3000 containing multiple fuel cells 300, one or more optional energy storage devices 400, a drivetrain 500 and one or more motive devices 600, shown notionally as a wheel. One or both of the fuel or oxygen sources 100A, 100B may be supplied via tank or related container, and may optionally be pressurized by a compressor or related pump. While the present system 1 is shown for mobile (such as vehicular) applications, it will be appreciated by those skilled in the art that the use of the stack 3000 and its ancillary equipment is equally applicable to stationary applications.

The fuel processing system 200 may be incorporated to convert a raw fuel, such as methanol into hydrogen or hydrogen-rich fuel for use in fuel cell 300; otherwise, in configurations where the fuel source 100A is already supplying substantially pure hydrogen, the fuel processing system 200 may not be required. The energy storage devices 400 can be in the form of one or more batteries, capacitors, electricity converters, or even a motor to convert the electric current coming from the fuel cell 300 into mechanical power such as rotating shaft power that can be used to operate drivetrain 500 and one or more motive devices 600. As stated above, the energy storage devices 400 are optional; as such, they are not necessary to the operation of the system 1, and may be done away with a certain configurations.

Figure 2:
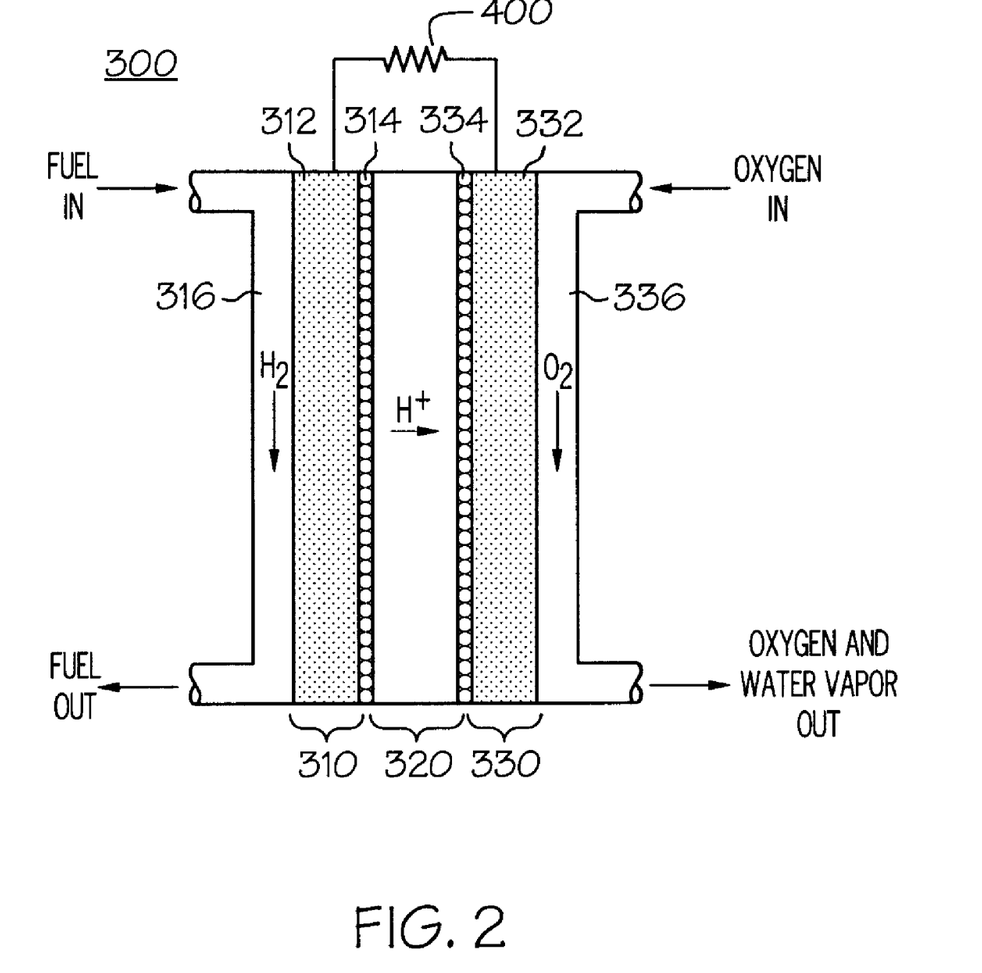
FIG. 2 shows a representative single fuel cell that is used to make up the fuel cell stack of FIG. 1.

Referring next to FIG. 2, fuel cell 300 includes an anode 310, cathode 330, and an electrolyte 320 disposed between anode 310 and cathode 330. In a preferred configuration, the fuel cell 300 is a PEM fuel cell, and while the present invention is especially applicable to PEM fuel cells, the use of other fuel cell configurations with the present invention is also within the purview of the present disclosure. The anode 310 includes a generally porous electrode substrate 312 (also referred to as a diffusion layer) and catalyst layer 314 connected to an anode flowpath 316. The cathode 330 includes a generally porous electrode substrate 332 (also referred to as a diffusion layer) and catalyst layer 334 connected to a cathode flowpath 336. Together, the substrates 312, 332, catalyst layers 314, 334 and electrolyte 320 define an MEA 350. Anode and cathode flowpaths 316, 336 (which may be formed, for example, as grooves in a bipolar plate (not shown) contact their respective anode and cathode to allow delivery of the appropriate reactants. Fuel (typically in the form of gaseous hydrogen) comes in contact with a catalyst (such as platinum or a related noble metal) on the catalyst layer 314 of anode 310. Electrochemical oxidation of the hydrogen fuel proceeds by what is believed to be a dissociate adsorption reaction facilitated by the catalyst. The positively-charged hydrogen ion (proton) produced at the anode 310 then passes through the electrolyte 320 to react with the negatively-charged oxygen ions generated at the cathode 330. The flow of liberated electrons from the ionization of the fuel sets up a current through an external circuit that may include the energy storing devices or other load 400 such that a motor or related current-responsive device may be turned.

Figure 3:
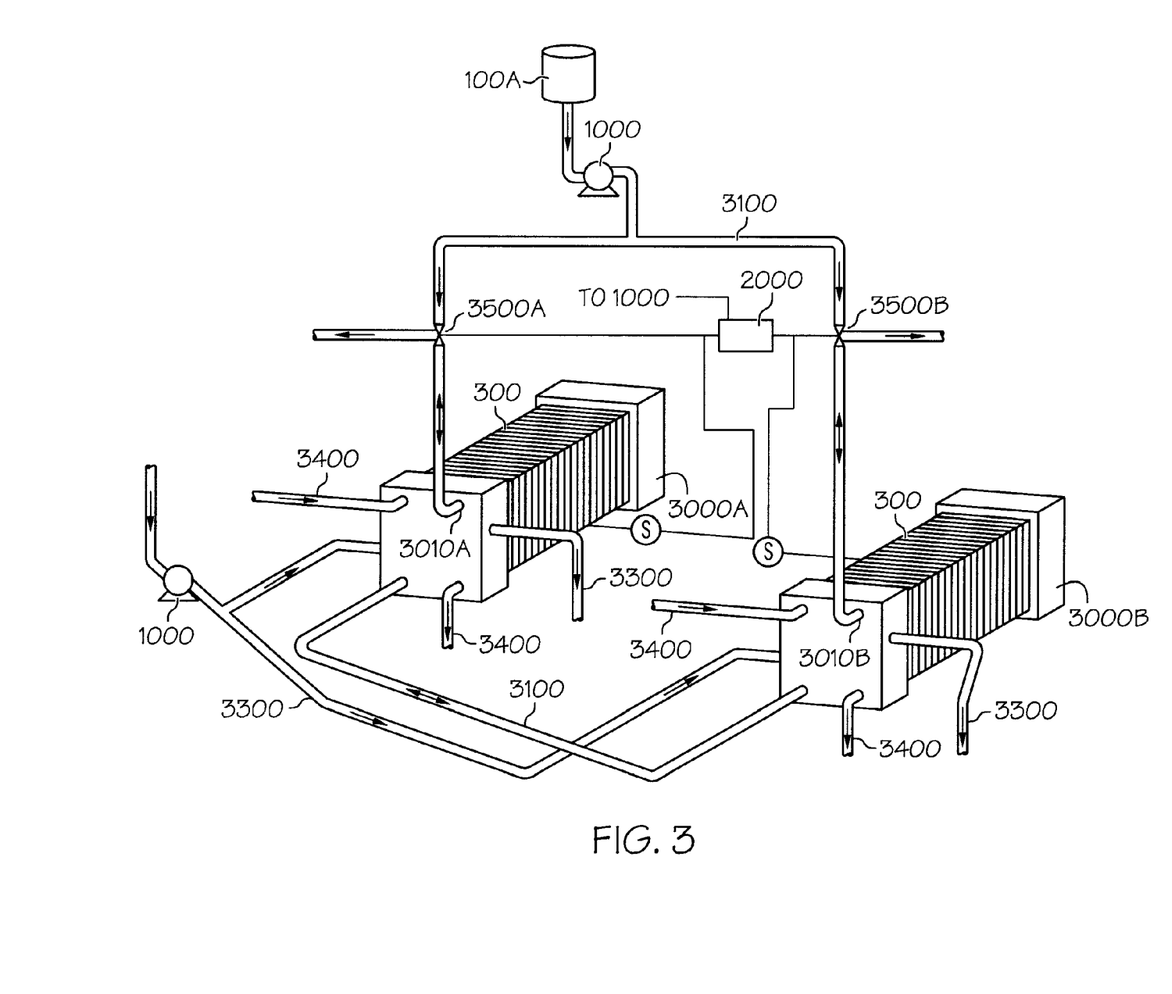
FIG. 3 shows a schematic diagram of a two-stack flow shifting fuel cell system.
Figure 4:
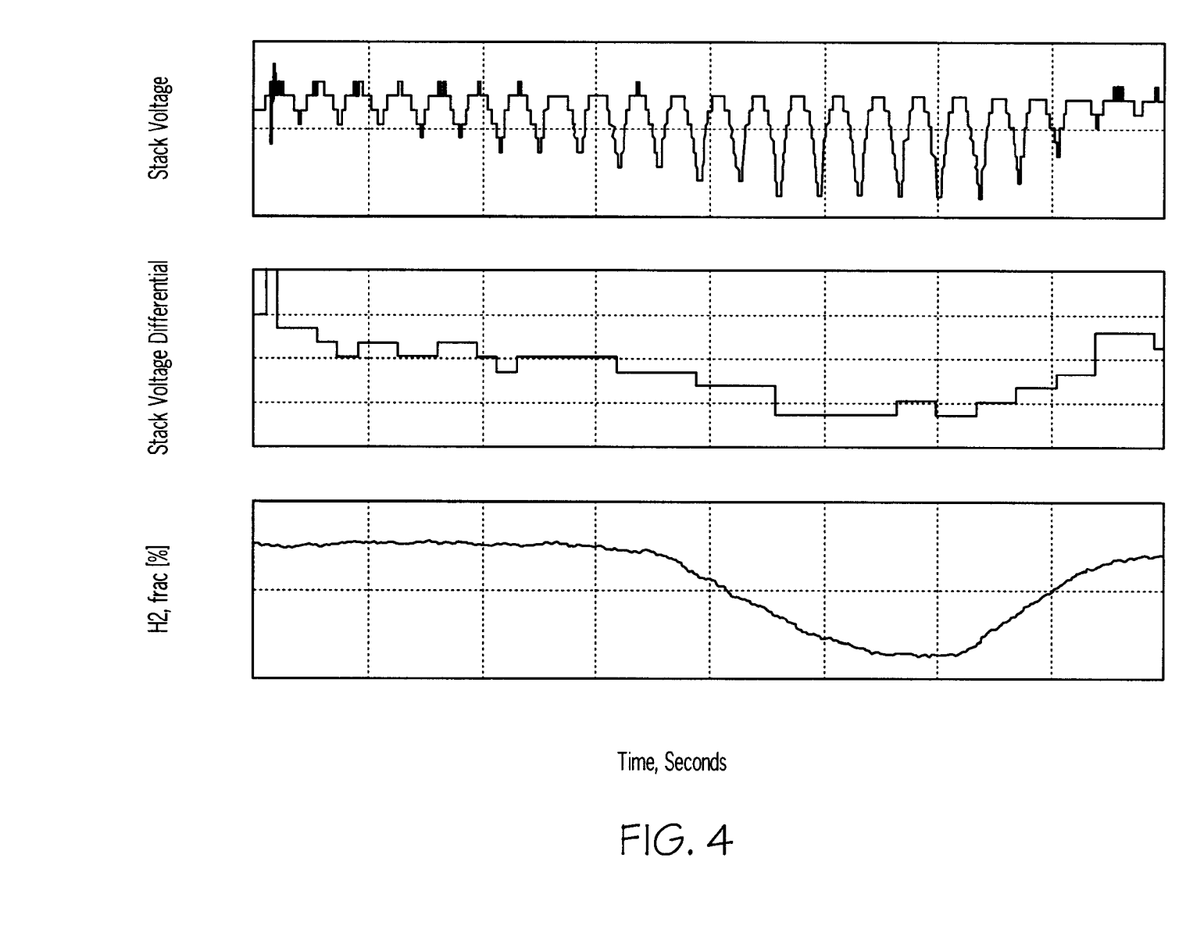
FIG. 4 shows the relationship between sensed voltage values and a reduction of hydrogen concentration in an anode flowpath of a flow shifting fuel cell system where no bleed valve operation took place.
Figure 5:
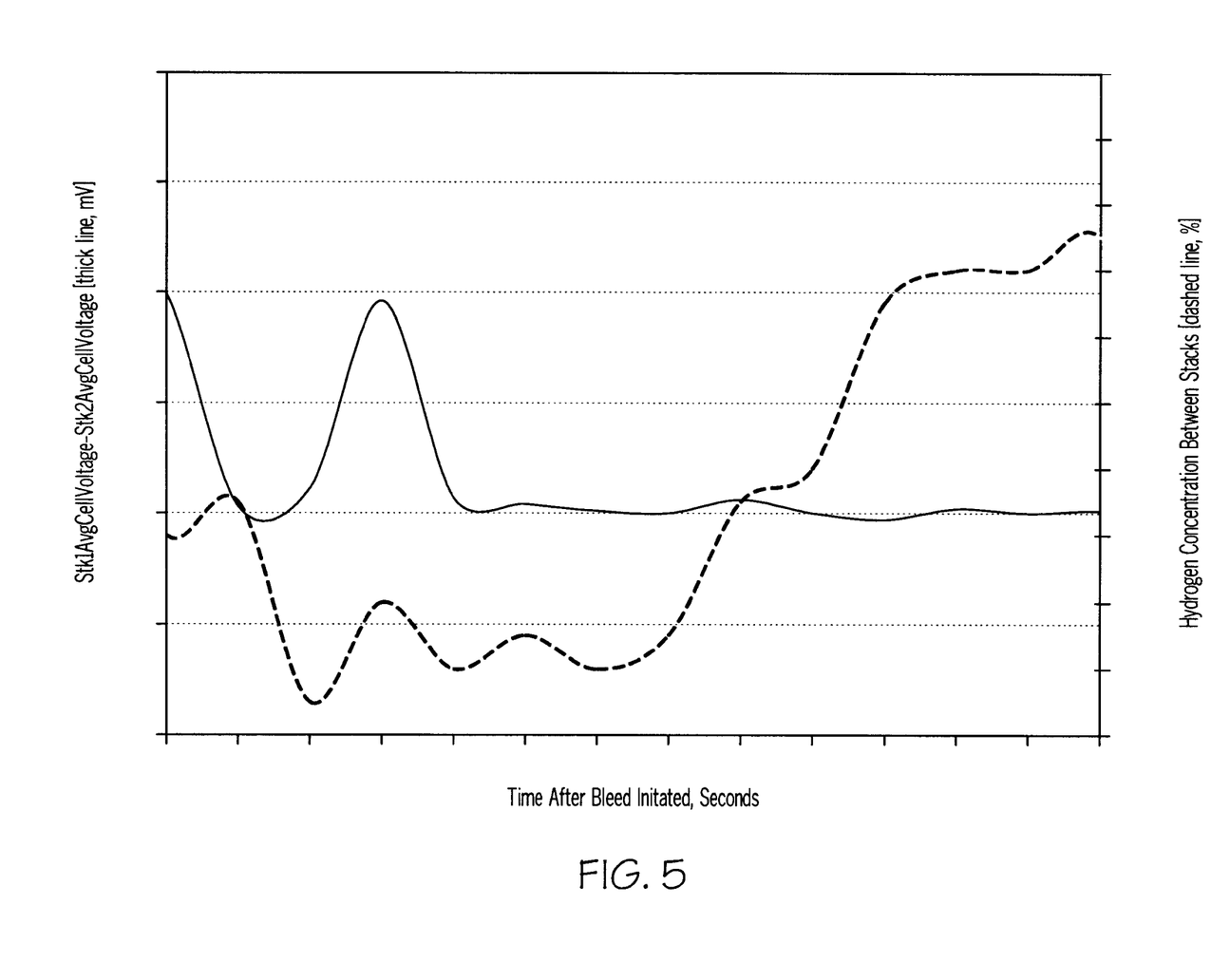
FIG. 5 shows reduction of hydrogen concentration in an anode flowpath of a flow shifting fuel cell system where a bleed valve is opened.

Referring next to FIGS. 3 through 5, a schematic diagram depicting the relationship between two stacks 3000A and 3000B that together make up stack 3000 in flow shifting fuel cell system 1, as well as graphs showing a relationship between hydrogen concentration and stack voltages in a notional system, are shown. While stacks 3000A and 3000B may notionally be referred to as a first and second stack respectively, that nature of the flow shifting system 1 is such that those skilled in the art will understand that such labels are relative, changing with each half-cycle shift in flow direction. In this configuration, voltage differences between stack 3000A and 3000B are compared to a predetermined threshold voltage (stored, for example, as data in controller 2000) to decide on when to operate one or both of the bleed valves 3500A, 3500B. In this way, the voltage difference acts as a reactive (rather than proactive) bleed trigger. A second reactive bleed trigger could be derived by subtracting the minimum cell voltage from the maximum cell voltage within either of stacks 3000A and 3000B to compute a voltage spread within the appropriate cell. This spread increases as nitrogen concentration increases. The present inventors observed, during tests conducted on a model flow shifting system, that there was a correlation between the hydrogen fraction and the difference between the voltages of the two stacks. Specifically, when the voltage difference was significantly high, it correlated to significant reductions in hydrogen concentration in the anode flowpath. Referring with particularity to FIG. 3, bleed valves 3500A, 3500B are configured as three-way valves. In this way, they can reduce component redundancy by being used for both the bleed function as well as the fuel injection function. For example, in a first position, valves 3500A, 3500B would allow flow from the fresh hydrogen from the fuel supply 100A to the bidirectional segment of the anode flowpath 3100 situated below the valve. In a second position (where there is no bleed), the valve would dead end the flow so all three segments connected to the valve are fluidly disconnected from each other. In the third position, the valve would allow flow from the bidirectional segment of the anode flowpath 3100 to the bleed segment (shown as the horizontal conduit). As mentioned above, the opening and closing of both valves 3500A, 3500B typically occurs sequentially rather than simultaneously in the two valves.

In an alternate embodiment (not shown), the hydrogen injection and bleed functions could be separated such that rather than employing a pair of three-way valves, a quartet of two-way valves can be used. In such a configuration, the injection valves, which have high pressure upstream of them, would preclude the possibility of bleeding into the upstream portion. It is generally preferred to avoid opening a bleed valve close to an operating fuel supply valve, as the opening of the bleed valve would purge substantially pure hydrogen rather than the intended mixture. Thus, while a bleed valve placed in between the stacks could stay open continuously, bleed valves placed close to fuel supply valves would need to be operated in an alternating fashion, both in regards to each other as well as in regard to the fuel supply valve close to them. Using a three-way valve for both fuel supply and bleed would ensure desirable operation by design. In such case, the system would require a separate conduit and set of valves to promote pressure differentials in the proper direction. For example, a two-way fuel injector valve could be connected to the fuel supply, while a separate two-way valve could be placed on the bleed segment. In operation, the first position would include having one set of the two-way valves positioned so that the bleed segment is closed and the fuel supply segment is open. In a second position, both the bleed and fuel supply segments would be closed, while in a third position, the bleed segment would be open while the fuel supply segment would be closed. In such a configuration, the valves used to inject fuel into the stacks could be configured as valve banks within an anode inlet unit, where two groups of valves can be alternately coupled to a fuel supply (such as through a distribution manifold or the like). As the flow of fuel through the anode flowpath goes through each of its half cycles, the flow can be passed through one or the other of the groups within the bank. The anode inlet unit may include multiple fuel injectors for each stack; such use of multiple valves for each gives added flexibility to vary the range of desirable hydrogen flow rates. For example, if three injectors are used for each stack, one injector can be sized to up to approximately one third of the maximum power output of the stack. Intermediate power levels can also be accommodated; for example, if a half power setting were desired, one injector would be completely open and a second would be half open. A programmable logic controller or other processing unit can be used to provide the necessary valve opening and closing logic. All such control functions may be integrated into the controller 2000 as modules that can execute the steps of a software or firmware program. Examples of such modules may include storage modules (for example, lookup tables or related data storage), linkage modules, processor or logic modules, as well as others. It will be appreciated by those skilled in the art that numerous control schemes to open and close the bleed valves 3500A, 3500B could be incorporated into controller 2000, including fuzzy logic, proportional integral derivative (PID) or the like.

Although shown as a pair of bleed valves 3500A and 3500B placed in the upper part of the anode flowpath 3100, the system 1 of the present invention may also employ a single bleed valve placed in the lower part of the anode flowpath 3100, between the two stacks 3000A, 3000B. In such a configuration, the purging or bleed operation can take place constantly, although short, intermittent openings of the valve may be beneficial. This variant offers simplicity over the approach discussed above where two bleed valves 3500A, 3500B are employed.

Anode flowpath 3100 defines a continuous loop that extends between a first set of ports (shown notionally at the lower left of each of stacks 3000A, 3000B) and between a second set of ports (shown notionally at the upper tight of each of stacks 3000A, 3000B). These various terms of spatial reference, such as "upper", "lower" and the like, are not to be construed in a limiting manner, but merely for the sake of clarity in describing the examples and embodiments of the invention described herein. For example, it will be appreciated that in matters of orientation, the stacks and other components could be rotated about one or more axes such that what defines upper and lower componentry becomes a matter of viewing perspective, and is not meant to detract from the overall configuration.

In operation, hydrogen is pumped from fuel source 100A by pump 1000 into the upper portion anode flowpath 3100. In an alternate embodiment (not shown), pump 1000 can be replaced by a pressurized fuel source, such as a pressurized hydrogen tank. In either form of fuel supply, and depending on which of the valves 3500A, 3500B are open, hydrogen flows to the anodes of one or the other of stacks 3000A, 3000B. As discussed above, in an anode flowpath flow shifting system, the direction of the anode flow oscillates back and forth such that it passes between the stacks in a semi-closed pattern. Evidence of such back-and-forth movement of the fuel can be seen in the parts of the anode flowpath 3100 marked with bidirectional arrows. By having one of the valves open while the other is closed has the effect of causing the flow through the anode flowpath 3100 to be in series, meaning that while the fuel flows through the anode flowpath 3100 through the first of the stacks, the closed valve in the other stack acts as a dead end to the flow. For example, by arbitrary convention, if the hydrogen is first introduced into the port 3010A configured as a temporary inlet of stack 3000A, valve 3500A is open to permit the introduction of fuel into stack 3000A. The connection of the two stacks by the lower portion of anode flowpath 3100 ensures that once the fuel has passed through stack 3000A, it will then enter into and pass through stack 3000B, after which it will pass through the port 3010B configured as a temporary outlet where valve 3500B prohibits further flow. In a preferred approach, the stoichiometry of the fuel entering the first stack 3000A is at two, meaning that there is enough hydrogen to fully fuel two such stacks. During this first part of the fuel flow cycle, the first stack 3000A is receiving substantially pure hydrogen, while the second stack 3000B is receiving hydrogen that has been diluted by nitrogen that has crossed over from the cathode flowpath. This causes the voltage to be produced in the first stack 3000A to be higher than that produced by the second stack 3000B. After a certain period (for example, a few seconds) the hydrogen supply into stack 3000A is switched off, being now switched to stack 3000B. This causes flow reversal (i.e., shifting) such that now the second stack 3000B gets pure hydrogen, causing its voltage to rise while the voltage of the first stack 3000A drops due to increasing nitrogen content. As the voltage difference between the two stacks is greatest shortly before this change in flow direction, this forms a convenient time to sample the stack voltages, although such samples could be taken at any time, as previously discussed. For example, the voltage samples could be taken with greater frequency, or even almost continuously. In situations where the sampling is timed to coincide with certain periods of oscillation, the aforementioned "sample and hold" approach can be used to detect and convey to the controller a desirable voltage measurement. In the sample and hold approach, a slow filter is applied to the absolute values of the difference of the stack voltages (which over time is oscillating according to the shifting process, while the voltage amplitude corresponds to the nitrogen concentration in the anode subsystem). By updating a stored maximum measured value of the amplitude while the actual value changes its sign and reaches its maximum amplitude again, the controller's job is simplified, as it only receives a new input value if the amplitude changes. Under such an operation, the controller does not need to follow the voltage oscillation. This measurement is also constantly compared to the threshold value and allowed to trigger a bleed at any time. As stated above, this measurement may be made in numerous different ways. For example, it may be based on the absolute value of the difference in the first and second stack 3000A, 3000B voltages, or based on an average difference in stack voltages, or based on the differences within an individual cell within a stack, or based on a difference between maximum and minimum voltages within a single stack. As an alternative to triggering the bleed operation when a threshold is exceeded, other approaches may be used. For example, in situations where the bleeding is taking place with great frequency (for example, to the point where it is continuous or nearly continuous), the voltage difference in the two stacks 3000A, 3000B may be used to change the differential pressure across one or both of the bleed valves 3500A, 3500B, the opening of one or both of the bleed valves 3500A, 3500B, or the duty cycle of the bleed valves 3500A, 3500B.

Based on the difference of the stack voltages, the controller 2000 determines how much anode flowpath gas (which is now a mixture of hydrogen and nitrogen) needs to be bled through the bleed valves 3500A, 3500B in order to maintain an appropriate hydrogen concentration in the anode flowpath 3100. In one embodiment, both stack voltages can be measured at the same time where, as discussed above, this simultaneous measurement can be intermittent or substantially continuous. Preferably, the measurement occurs more often than the flow-shift frequency. Also, as mentioned above, other configurations may permit other measuring schemes, such as measuring voltages within a single stack or even within a single individual cell within a stack. Predetermined thresholds of hydrogen/nitrogen fractions may be stored in a formula-programmed logic device, lookup table or related memory device in controller 2000, and can be used to determine the conditions for bleed valve operation. These values may also be useful for calculating the needed airflow if the bleed gas from the anode flowpath 3100 is mixed into the offgas stream of the cathode flowpath 3400 during exhaust mixing. For example, it is desirable to keep the hydrogen concentration within this stream below a given limit for flammability concerns, and knowledge of the hydrogen/nitrogen ratio can be used to ensure such levels. Fuel cell system 1 efficiency is enhanced by the operation of the present approach, as by knowing the anode gas concentration rather than assuming a worst case assumption for the anode hydrogen concentration (i.e., 100%) will decrease the needed airflow from cathode flowpath 3400. The present approach is also more efficient than relying on a timed opening of the bleed valves 3500A, 3500B that does not take into account actual reductions in stack voltage output. In such un-optimized timed situations, bleed valves may be opening before it is necessary, with a concomitant purging of otherwise useable hydrogen. The controller 2000 (which can be programmed to include the present algorithm, discussed in more detail below) determines when the bleed valves 3500A, 3500B should be closed again. This determination may take in a range of factors from the simplistic to the sophisticated that can all be fed into the controller 2000. For example, a simplistic approach could instruct the valves to open only upon attainment of a voltage difference threshold between the two stacks 3000A, 3000B, in which case the bleeding will continue until the measurement feedback returns to a value below the threshold. Inherent in this may be a brief hysteresis period to ensure both a margin and to create an appropriate deadband. It will be appreciated by those skilled in the art that other parameters could be used to effect valve opening and closing.

Referring with particularity to FIGS. 4 and 5, the effect of operating bleed valves on a notional system with a pair of stacks, each with two hundred individual fuel cells, is shown. In the example depicted in these two figures, voltage sampling occurs simultaneously in each of the stacks, although (as stated earlier) other sampling schemes and other stack configurations may be employed with equal applicability. The three graphs of FIG. 4 show voltage trends and corresponding hydrogen fraction in an anode flowpath over a notional sampling interval where there is bleeding at the beginning of the cycle (to keep the hydrogen concentration substantially constant) than no bleeding in the middle part of the cycle (where the hydrogen concentration decreases) and than bleeding again near the end of the cycle (where the hydrogen concentration increases again). In the first graph of FIG. 4, a total voltage produced by one of the stacks is shown. Here, it can be seen that the voltage is high while the stack is in the upstream half of the flow shifting cycle, and is low while the stack is in the downstream half of the flow shifting cycle. The oscillation period is the same as the duration of one flow shifting cycle. In the second graph, fresh hydrogen is supplied, causing an almost instantaneous increase in sensed voltage differential between the two stacks, after which the voltage differential takes on an oscillatory pattern. The second graph also shows the difference between the high voltage level of the upstream stack and the low voltage level of the downstream stack just a short moment before the order of the stacks is switched. The difference is treated in a sample and hold manner to provide a value to the dependant control algorithms until the next evaluation just before the following manipulation of the hydrogen supply valves. In the third graph, the hydrogen concentration in the anode flowpath can be seen as following the voltage differential trend of the second graph. If the amount of nitrogen is very low, such as during the beginning of the test, the downstream stack is supplied with an almost pure hydrogen concentration similar to that which is supplied to the upstream stack. Therefore the stack voltages are basically the same. After a while, the hydrogen concentration of the fuel supplied to the downstream stack decreases and causes lower voltages in the downstream stack, which in turn results in a larger voltage difference relative to the stack being supplied with pure hydrogen. In FIG. 5, the voltage differential and concomitant hydrogen concentration is depicted after initiation of a bleed activity. After an initial adjustment phase, where it takes about four seconds for the voltage to respond and about seven seconds for the hydrogen concentration to go up, the voltage difference is minimized (typically staying at or near about 0.1 volts in the present graph) and remains stable. This is well below a voltage difference threshold set for operation of the notional system; if a difference greater than the threshold were to be measured, then the bleed algorithm can be configured to remain on for an additional period of time. In the present example, this lasts thirteen seconds, although based on the stability of the voltage difference, this duration could be shortened. A second important observation to make is that the hydrogen concentration between the two stacks is generally increasing while the bleeding is occurring. This is in contrast to the scenario of FIG. 4, where there is no bleed and the hydrogen the concentration is decreasing.

As mentioned above, the correlation of hydrogen concentration to voltage differentials can be derived from a lookup table or related collection of stored data. Another approach to determining hydrogen concentration based on sensed voltages can be made through an algorithm that can be programmed into the controller's programmable logic controller or related device or module. The following formula (which is generalized for ideal flow conditions) gives an idea of how the cell voltages decrease with decreasing anode hydrogen partial pressure at the anode catalyst:

$$U_0 = U^0 + \frac{RT}{2F}\left(\ln\frac{p_{H_2cat}}{p^0} + \frac{1}{2}\ln\frac{p_{O_2cat}}{p^0}\right) + \frac{\Delta_R S}{2F}(T - T^0)$$

where F is Faraday's constant (96,485 coulombs/mol), R is the molar gas constant (8.314 J/mol/K), $T^0$ is the standard temperature (298.15 K), $p^0$ is the standard pressure (1.0 bar), S is the molar reaction entropy (J/mol/K), T is the temperature (K), $U_0$ is the open cell voltage (V), $U^0$ is the open cell voltage at standard condition (V) and cat is measured at the catalyst.

As indicated above, controller 2000 communicates with the various components of fuel cell system 1 to control and coordinate their operation. For example, controller 2000 may be made to communicate with pumps 1000 or another source of pressurized fuel (such as a fuel tank) to control the flow of anode and cathode reactant supplied to fuel cell stacks 3000A, 3000B. The controller 2000 may also be used for other fuel cell functions, such as operating a coolant supply system (not shown). Controller 2000 also receives signals from sensors S to compare against stored values. Controller 2000 further sends control (i.e., open or close) signals to valves 3500A, 3500B to determine flow shifting as well as bleed valve operation. For example, when the sensors S measure a voltage difference between both of the stacks 3000A, 3000B that falls below a prescribed threshold value (in a configuration where voltage sensing is between the two stacks), or when the voltage difference is between a single stack 3000A or 3000B or an individual cell 300 within one of the stacks (in a configuration where voltage sensing is conducted at two different times within the same stack or cell), such value, when compared against the logic stored in the controller 2000, can be used to manipulate one or more of the valves. Controller 2000 is presently shown as a single controller; however, it will be appreciated by those skilled in the art that a set of multiple distributed controllers whose actions are coordinated may also be used. In either configuration, controller 2000 may include one or more application specific integrated circuits (ASICs) or related modules that provide the desired functionality. Such devices may define a programmable logic controller or other processing unit. They may further include shared, dedicated or group processors, supporting electronic circuit, and a memory that together execute one or more software or firmware programs. In such case, the formula discussed above could form the basis for an algorithm that could be programmed into and used by an ASIC, module or other logic device within controller 2000 to manipulate flow shifting times, bleed valve opening and closing instructions or the like.

Sensors S may be used to provide feedback to the controller 2000 indicative of certain actions taken by the controller 2000. For example, the sensors provide feedback on the effect of bleed valve opening on the voltage within the stacks 3000A, 3000B. One of the advantages of using conventional voltage sensors is in their inherent robustness. Rather than using direct hydrogen-measuring devices such as thermal conductivity sensors, mass spectrometers, gas chromatographs or the like (which are expensive and relatively fragile, two features generally incompatible with vehicular or other mobile applications), the present invention may employ sensors S that can stand the high humidity and vibratory environment over lengthy periods of operation. While sensors S are shown connected to each of the stacks 3000A and 3000B to measure voltage values therein and transmit a signal indicative of the sensed parameter along one or more signal-carrying lines to the controller 2000, they may also be disposed elsewhere in fuel cell system 1 to measure and transmit appropriate signals. One example may be a sensor configured to measure the degree of openness of the bleed valves 3500A, 3500B.

As previously mentioned, when the controller 2000 detects voltage difference values that are below a predetermined range, the controller 2000 may open the bleed valves 3500A, 3500B to reduce the nitrogen fraction in the anode flowpath 3100. In the two-stack configuration depicted in FIG. 3, the hydrogen fraction is estimated by comparison of the voltage reading in a first stack 3000A being supplied with substantially pure hydrogen versus that of a second stack 3000B where the supply hydrogen is mixed with an unknown amount of nitrogen. Measurements of voltages in different stacks at the same time or within the same stack at different times can be used (with, for example, the formula discussed above) to estimate the hydrogen fraction. Advantages associated with the present approach include no additional components costs (as the sensors are already being used to monitor stack voltage values), possible improved system durability (as there is less dry hydrogen being injected into the system), improved efficiency (as less useable hydrogen is vented during bleed valve opening) and improved transient operation (as the hydrogen concentration is not allowed to drop to such a low level that instabilities arise).

While certain representative embodiments and details have been shown for purposes of illustrating the invention, it will be apparent to those skilled in the art that various changes may be made without departing from the scope of the invention, which is defined in the appended claims.

What is claimed is:

1. A method of operating a fuel cell system, said method comprising:
    configuring said system to comprise:
        a first fuel cell stack and a second fuel cell stack, each comprising a plurality of individual fuel cells within, each of said individual fuel cells comprising an anode, a cathode and a membrane disposed between said anode and cathode;
        a cathode flowpath configured to couple said cathodes of said individual fuel cells within each of said first and second stacks to an oxygen source;
        an anode flowpath configured to couple said anodes of said individual fuel cells within each of said first and second stacks to a fuel source, said anode flowpath configured to be connected between said first and second stacks such that fuel present within said anode flowpath cycles back and forth between said first and second stacks;
        at least one bleed valve fluidly coupled to said anode flowpath; and
        at least one sensor configured to measure a voltage;
    introducing fuel into said anode flowpath such that said fuel flows through said stacks in a first direction;
    introducing oxygen into said cathode flowpath;
    repeatedly reversing said flow of fuel through said anode flowpath such that said fuel flows through stacks in a second direction from the second fuel cell stack to the first fuel cell stack;
    sensing a voltage difference between the fuel cell stacks associated with operation of said system;
    correlating said sensed voltage difference with a fuel concentration in said anode flowpath; and
    upon attainment of a threshold value of said voltage difference based on said correlating, manipulating said at least one bleed valve to allow at least a portion of said fluid present in said anode flowpath to escape.

2. The method of claim 1, wherein said system further comprises a controller cooperative with said at least one sensor and said at least one bleed valve such that said controller performs said correlating between said sensed voltage difference and said fuel concentration in said anode flowpath to determine if said attainment of said threshold has been reached.

3. The method of claim 2, wherein said fuel concentration in said anode flowpath is represented in said controller by values in a lookup table.

4. The method of claim 2, wherein said fuel concentration in said anode flowpath is represented in said controller by a formula according to the following equation:

$$U_0 = U^0 + \frac{RT}{2F}\left(\ln\frac{p_{H_2 cat}}{p^0} + \frac{1}{2}\ln\frac{p_{O_2 cat}}{p^0}\right) + \frac{\Delta_R S}{2F}(T - T^0).$$

5. The method of claim 1, wherein said sensing a voltage difference associated with operation of said system comprises sensing a voltage of said first and second stacks substantially simultaneously.

6. The method of claim 5, wherein said sensing a voltage difference of said first and second stacks substantially simultaneously further comprises determining an average voltage within each of said first and second stacks such that said correlating comprises correlating said average voltages with said fuel concentration in said anode flowpath.

7. The method of claim 1, wherein said sensing a voltage difference associated with operation of said system comprises sensing a plurality of voltage differences within one of said first and second stacks such that an average value within said one of said first and second stacks can be determined.

8. The method of claim 1, wherein said sensing a voltage difference associated with operation of said system comprises sensing a plurality of voltage differences within a single fuel cell within at least one of said first and second stacks.

9. The method of claim 1, wherein said manipulating said at least one bleed valve further comprises closing said at least one bleed valve after a passage of time that corresponds to no more than one complete anode flowpath operating cycle.

10. The method of claim 1, wherein said manipulating said at least one bleed valve further comprises closing said at least one bleed valve after a passage of time that is proportional to the magnitude of voltage difference between said first stack and said second stack.

11. The method of claim 1, wherein said at least one bleed valve comprises at least one three-way valve such that said at least one bleed valve selectively places said fuel source in fluid communication with said anode flowpath.

12. The method of claim 1, wherein said at least one bleed valve is fluidly disposed between said first and second stacks.

* * * * *